United States Patent
Burton et al.

(10) Patent No.: US 7,414,383 B2
(45) Date of Patent: Aug. 19, 2008

(54) MULTI-PHASE VOLTAGE REGULATOR WITH PHASES ORDERED BY LOWEST PHASE CURRENT

(75) Inventors: Edward Allyn Burton, Hillsboro, OR (US); Robert J. Greiner, Beaverton, OR (US); Anant S. Deval, Beaverton, OR (US); Douglas Robert Huard, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 148 days.

(21) Appl. No.: 11/434,308

(22) Filed: May 12, 2006

(65) Prior Publication Data

US 2007/0262759 A1    Nov. 15, 2007

(51) Int. Cl.
    G05F 1/59    (2006.01)
(52) U.S. Cl. .................. 323/271; 323/283; 323/285
(58) Field of Classification Search ............. 323/271, 323/282, 283, 285
    See application file for complete search history.

(56) References Cited

U.S. PATENT DOCUMENTS

| | | | | |
|---|---|---|---|---|
| 5,959,441 | A * | 9/1999 | Brown | 323/282 |
| 6,150,803 | A * | 11/2000 | Varga | 323/282 |
| 6,583,610 | B2 | 6/2003 | Groom et al. | 323/288 |
| 6,813,173 | B2 * | 11/2004 | Lipcsei | 363/98 |
| 6,850,045 | B2 * | 2/2005 | Muratov et al. | 323/272 |
| 6,943,535 | B1 * | 9/2005 | Schiff | 323/246 |
| 7,026,798 | B2 * | 4/2006 | Cheung et al. | 323/225 |
| 7,061,215 | B2 * | 6/2006 | Harris | 323/268 |
| 7,122,995 | B2 * | 10/2006 | Hasegawa et al. | 323/272 |
| 7,161,337 | B2 * | 1/2007 | Nishimori | 323/271 |
| 7,262,628 | B2 * | 8/2007 | Southwell et al. | 324/769 |
| 2005/0007081 | A1 * | 1/2005 | Schuellein et al. | 323/271 |
| 2005/0083024 | A1 * | 4/2005 | Harris et al. | 323/282 |
| 2006/0012351 | A1 * | 1/2006 | Moussaoui et al. | 323/271 |

OTHER PUBLICATIONS

"Power Delivery for High-Performance Microprocessors", Electronic Package Technology Development, Intel Technology Journal, vol. 9, Issue 04, Nov. 9, 2005—ISSN: 1535-864X, DOI: 10.1535/itj.0904.

Edward Stanford, "New Processors Will Require New Powering Technologies", TDI Power System Solutions, Power Electronics Technology, Feb. 1, 2002 (pp. 1-7).

Michael T. Zhang, "Powering Intel Pentium 4 Generation Processors", Platform Technology Operations, Intel Corp., OR, USA, IEEE 2001 (pp. 215-218).

U.S. Appl. No. 10/750,585, filed Jul. 7, 2005, Inventor—Edward A. Burton, entitled "Regulating Voltage Applied to An Integrated Circuit and Proxy Frequency" (File No. P18039).

U.S. Appl. No. 11/152,280, filed Jun. 14, 2005, Inventor(s)—Edward Burton, et al., entitled "IC with fully integrated DC-to-DC power converter" (File No. P21504).

U.S. Appl. No. 11/434,423, filed May 12, 2006, Inventor(s)—Edward Burton, et al., entitled "Power Supply Control With Current Surge Balance Control" (File No. P23439).

U.S. Appl. No. 11/432,868 filed May 12, 2006, Inventor(s)—Doug Huard, et al., entitled "Voltage Regulator for Microelectronic Devices Using Dual Edge Pulse Width Modulated Control Signal" (File No. P23959).

* cited by examiner

Primary Examiner—Jeffrey L Sterrett
(74) Attorney, Agent, or Firm—Blakely, Sokoloff, Taylor & Zafman LLP

(57) ABSTRACT

While firing a number of phases of a multi-phase switching voltage regulator in a sequence, a determination is made as to which one of the phases has the lowest phase current. Then, the next phase, to be fired in the sequence, is selected as the one that has been determined to have the lowest phase current. Other embodiments are also described and claimed.

17 Claims, 9 Drawing Sheets

MULTI-PHASE VOLTAGE REGULATOR WITH PHASES ORDERED BY LOWEST PHASE CURRENT

Some of the subject matter described in this application is related to material in U.S. application Ser. No. 11/434,423, filed May 12, 2006 entitled "Power Supply Control With Current Surge Balance Control" (P23439); and U.S. application Ser. No. 11/432,868, filed May 12, 2006, entitled "Voltage Regulator for Ivlicroelectronic Devices Using Dual Edge Pulse Width Modulated Control Signal" (P23959).

An embodiment of the invention is related to power delivery for high performance integrated circuits, and more specifically to point of use voltage regulators for microprocessors. Other embodiments are also described.

BACKGROUND

Over the last several decades, significant advancements have been made in personal computer (PC) microprocessor architecture and fabrication techniques, to improve performance and control costs. With each successive generation, an increasing number of functions have been integrated into a processor integrated circuit die. This increase in density has been enabled by shrinking the size of the constituent transistor elements, thereby allowing more transistors per unit area on the die. Performance improvements have been obtained by for example increasing the clock frequency at which certain functions of the processor operate. As a result, each successive generation of such processors is more powerful from a total performance standpoint, and has increasing overall power consumption.

The power consumption of a processor is proportional to a product of its power supply voltage and current. Successive generations of processors with increasing transistor density operating at higher speeds (e.g., higher dock frequency) demand a lower power supply voltage but higher power supply current. For example, in the early days of microprocessors offered by Intel Corp. of Santa Clara, Calif., transistor count per die was in the low 100,000s, processor clocks were running at around 100 MHz, supply voltages were at 5V DC, and supply current was no more than 10 A (depending on the activity level of the processor). With more recent Pentium class processors, transistor count per die is well above 1 million, clocks are in the GHz range, the power supply voltage needs to be dropped to about 1.2V DC or less, while current draw (at high activity levels) easily surpasses 100 A.

The supply voltage needs to be regulated to stay within a certain range, in the presence of operating temperature variations and as the processor transitions between different activity levels. However, the smaller supply voltages have resulted in tighter ranges being required, in the face of large current swings. This has led to many challenges in providing low cost power delivery for advanced processors.

To ensure reliable power delivery for its microprocessor families, Intel has set voltage regulator design guidelines. A voltage regulator (VR) is an electronic circuit that draws current a power source, to feed the processor and maintain a well-regulated power supply voltage for the processor. The VR maintains a setpoint voltage (e.g., at a so-called "Vcc" node of the processor), using a feedback control loop that repeatedly senses deviations from the setpoint, and corrects for them by increasing or decreasing the amount of current drawn from the source. For greater power conversion efficiency, switching-type regulators are used that draw current from the source using transistor or similar devices that turn on and off at high rates and stay on for relatively short pulses. The setpoint voltage is maintained by suitably controlling the pulse widths or duty cycle.

Conventional switching VRs for high performance processors have more than two phases or paths to the power source, through which current is drawn to maintain the supply voltage. The multiple phases help reduce the magnitude of voltage and current ripple, which enables the use of smaller phase inductors and power transistor switches, as well as smaller filtering and decoupling components at the output of the VR. In addition, a multi-phase switching VR can be made to respond quickly to deviations from the setpoint voltage (both voltage droops and voltage spikes), thereby helping maintain the smaller supply voltages within tighter tolerance bands.

Conventional multi-phase VRs have a fixed phase-firing order. The phases are all fired at the same frequency, but time shifted relative to each other. For example, a 100 kHz two-phase regulator will have both phases switching at 100 kHz, with the assertion edges of the two phases separated by five microseconds (one-half the switching period). This approach, however, is problematic when the load current to the VR (for example, the power supply current to a processor) is in essence synchronized to the switching frequency. For instance, a periodic load of five microseconds high current, five microseconds low current creates a serious current imbalance in the two-phase 100 kHz VR. If left unchecked, the current imbalance may quickly reach the per-phase current-limit and usually lead to some form of automatic shutdown of the VR which causes a catastrophic error during operation of the computer system.

There are conventional schemes to reduce the fatal current imbalance, where such schemes typically rely heavily on bulk capacitance at the output, to reduce the need for temporal alignment of current into the VR versus current out of the VR. In one case, a phase current is compared with an average current (that represents the average current amongst all of the phases), and the duty cycle is controlled on that basis to minimize the difference of current in each phase.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

An embodiment of the invention is directed to the dynamic reordering of phase firing in a multi-phase VR that can reduce the severity of, or may even eliminate, phase current imbalance. In one embodiment, the phases are always fired in order of lowest current. Using such a technique, synchronous loads should no longer pose a current balance problem, without having to rely on large bulk capacitances at the output of the VR.

Figure 1:
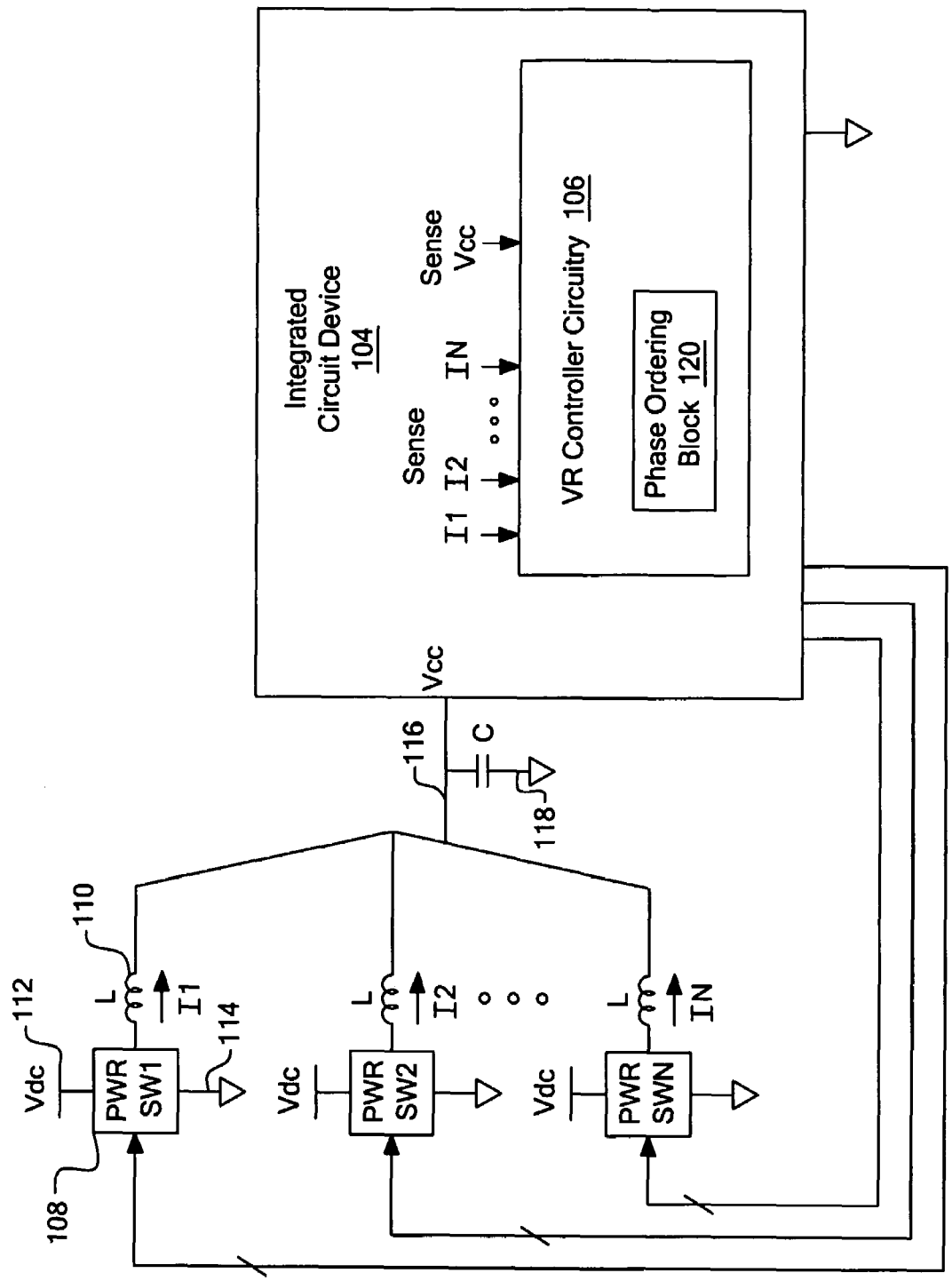
FIG. 1 is a schematic diagram of a voltage regulator that is coupled to power an integrated circuit device, according to an embodiment of the invention.

Beginning with FIG. 1, a schematic diagram of a multi-phase VR that is coupled to power an integrated circuit (IC) device 104 is shown, in accordance with an embodiment of the invention. Only the relevant portions of the VR are shown, including two or more (N) phases that feed the same output node 116. A capacitor 118 on the output node 116 represents any low pass filtering and/or decoupling capacitance that is needed. This includes not just bulk capacitance but also structures that are on-chip or in-package with the IC device 104. The output node 116 in this case is also the input power supply node or "pin" of the IC device 104 (with voltage Vcc).

Each phase includes a solid state power switch 108 that connects a path of current into an inductor 110, from either a power supply node 112 (with voltage Vdc) or a power return node 114 (ground). In operation, the power switch 108 either drives phase current I1 from Vdc into the inductor 110 (in a particular direction), or allows the existing current I1 in the inductor 110 to recirculate through the power return node 114. These actions are controlled by one or more control signals that are provided by VR controller circuitry 106. The circuitry 106 implements closed loop control of Vcc at node 116, based on feedback information. The feedback information in this example includes the sensed phase currents I1, I2 ... IN and the output voltage Vcc. The control signals to the power switches 108 may be binary signals that are pulse width modulated using known feedback control compensation schemes to regulate Vcc at a given set point voltage.

Although FIG. 1 shows the VR controller circuitry 106 as being part of the integrated circuit device 104 (e.g., on-chip or in the same integrated circuit package as the device 104), an alternative is to provide the circuitry 106 as a separate package or device for use with different types of integrated circuit devices 104.

According to an embodiment of the invention, the VR controller circuitry 106 has a phase ordering block 120 that controls which of the N phases is selected to be fired next. The phase ordering block 120 determines which one of the phases has the lowest phase current, while a number of the N phases are being fired in a sequence. See FIG. 2 which depicts an example firing sequence for a 6-phase VR (N=6), in accordance with an embodiment of the invention. This example sequence has thirteen (13), non-overlapping phase firings. Rather than being fired in a round robin fashion or a fixed order, the phases are fired in what may appear to be a random order. A phase need not be fired every six times. The ordering, however, is not random. Rather, the phase ordering block 120 selects the next phase, to be fired in the sequence, as the one that has been determined to have the lowest phase current. In other words, just before each phase identified in sequence 124 was fired, it had the lowest phase current. This technique allows the current imbalance, that typically occurs in a multi-phase VR in the presence of a synchronous load, to be reduced substantially, or even completely eliminated, without requiring heavy filtering or decoupling at the output of the VR.

Figure 2:
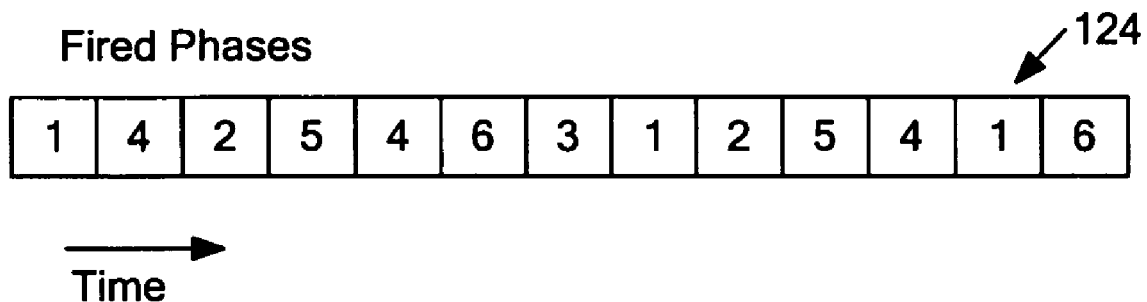
FIG. 2 depicts an example firing sequence, according to an embodiment of the invention.

FIG. 2 may also be viewed in a different way, namely as a set of two sequences each such sequence having six (6) firings (namely {142546} and {312541}), followed by a single firing of phase 6. The two sequences are, of course, different. In accordance with an embodiment of the invention, a switching VR is capable of at least N different phase firing sequences, each sequence being defined as N phase firings (and where N is the number of phases in the VR). The number of different sequences is no more than N raised to the power of N. For example, if N=5, then there are at least five (5) different sequences (of five firings each), and no more than 5^5=3125.

As mentioned above, the phase ordering block 120 selects the next phase based on having determined which one has the lowest phase current at a given point in time. The term "phase current" here may refer to the instantaneous current I1 through the phase inductor 110 of a particular phase. It should be understood that there is a practical tolerance band around what is referred to as "the lowest" phase current. For example, there may be two or more phases all of which are within a few percent of each other and are otherwise by far the lowest amongst the rest of the phases. In that case, any one of them may be selected by the phase ordering block 120 to be the "lowest", and the selected one need not be the one with the actual lowest phase current.

Also, a reference to the phase current being "determined" means that the phase current is sensed, a numerical value is obtained based on a sensed or measured value of current, or, if accurate enough, the determination may be solely a calculation and/or look-up.

It should also be noted that although in FIG. 2, the sequence of phase firings is a series of single-phase firings, the various embodiments of the invention are not limited to that type of single-phase firing. In some cases, such as where an extra boost of current may be specified to raise the output voltage Vcc, the phase ordering block 120 may select two or more "lowest" phases that will be fired simultaneously. Thus, for example, instead of phases two and five being fired sequentially as shown, they could be fired simultaneously.

In yet another embodiment, the VR may occasionally fire a non-minimum phase (e.g., switch to a round-robin, random, or always-the-same phase selection scheme.) Thus, not every phase firing sequence need be ordered by lowest phase current.

Figure 3:
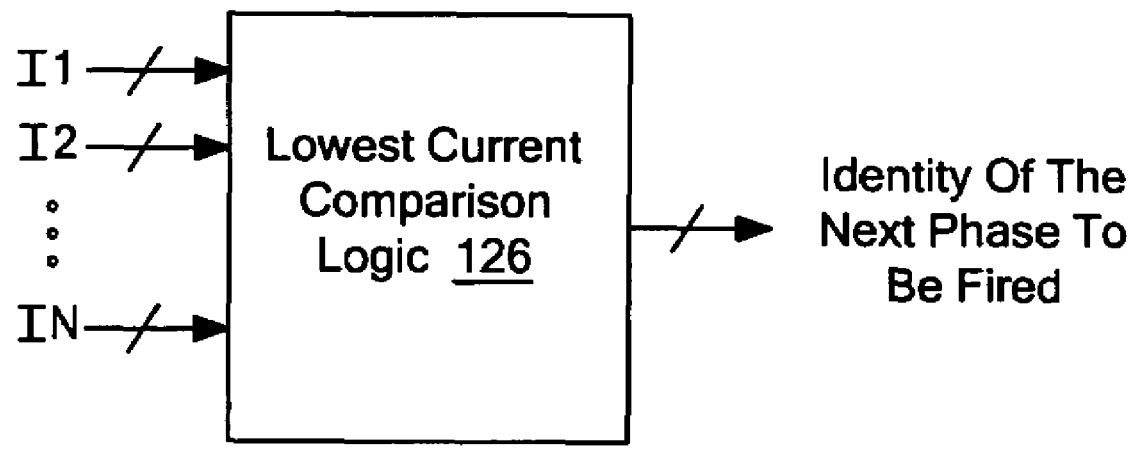
FIG. 3 is a block diagram of some components in a phase ordering block of a voltage regulator, according to an embodiment of the invention.

Turning now to FIG. 3, this figure shows current comparison logic 126 that may be part of a phase ordering block 120 of the VR, according to an embodiment of the invention. In this case, the comparison logic 126 receives up to N binary values of phase currents (for their respective phases) that have been determined by the VR circuitry 106. The comparison logic 126 compares these input phase current values (which in this case are binary numbers) to determine which is numerically the lowest value.

It should be noted that the phase current comparisons may at times be ambiguous or non-deterministic, when any one or more phases has nearly equal current. As a result, just a pure comparison may lead to paradoxical results—for example A is greater than B and B is greater than C, but C is greater than A. The comparison logic 126 should thus handle all paradoxical cases in a deterministic and reasonable manner, providing at its output the identity of the phase with lowest current (which would also be the phase to be fired next). As an alternative, the comparison logic 126 may provide the identities of multiple phases that have the lowest phase currents. In that case, the phase ordering block 120 would have to make a further decision to select one of the phases that have been identified, as the next phase to be fired.

As an alternative to the "all digital" approach described above in connection with FIG. 3, the determination of the lowest phase current may involve analog or continuous time circuitry, making comparisons between analog signal levels that represent the respective phase currents. This embodiment is described below in connection with FIG. 7.

Figure 4:
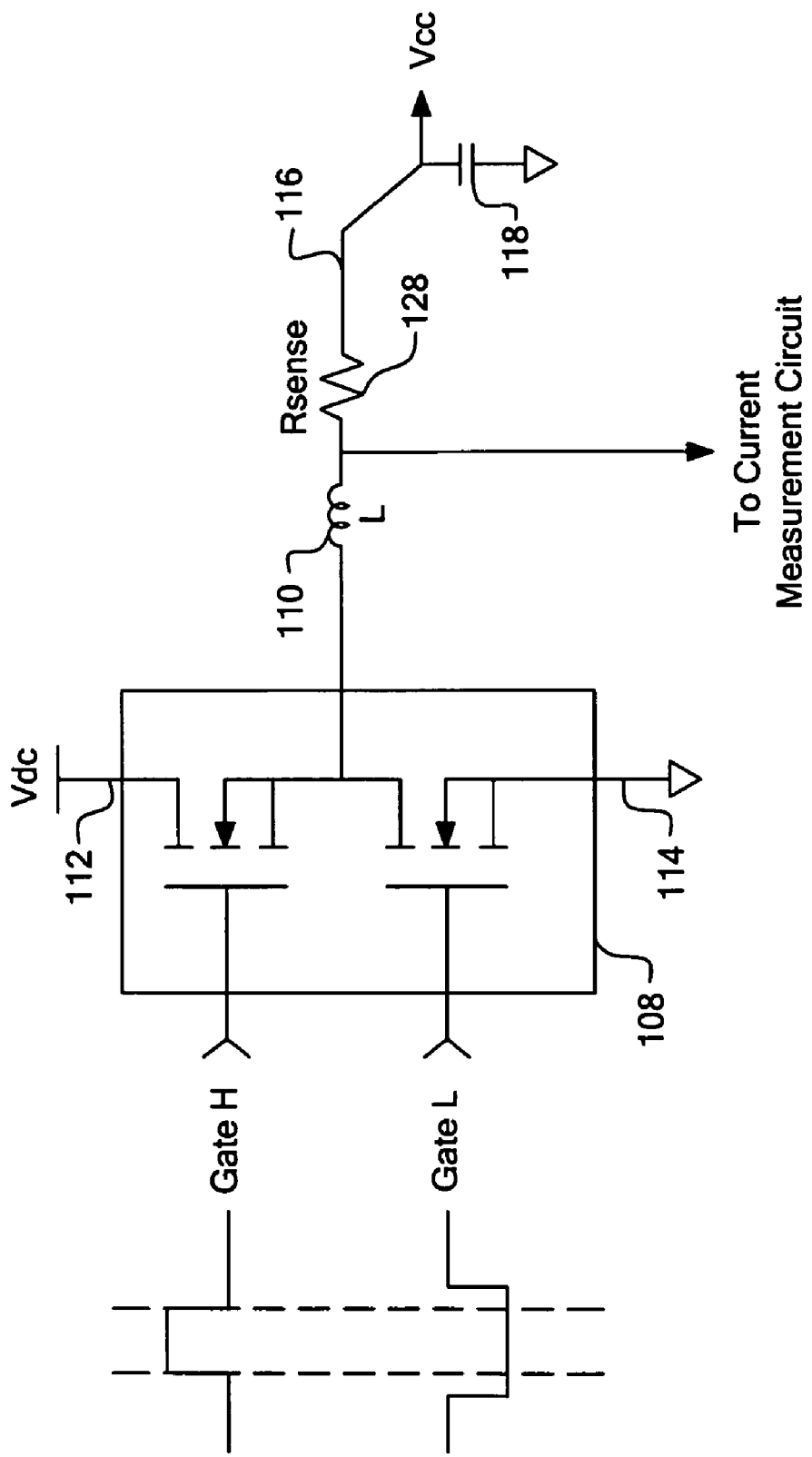
FIG. 4 is a circuit schematic of an example, single phase in a multi-phase switching voltage regulator.

In FIG. 4, a circuit schematic of an example single phase, of a multi phase VR, is shown. In this case, the power switch 108 includes a high side transistor that connects the inductor 110 to power supply node 112, and a low side transistor that connects the inductor 110 to power return node 114. The high side transistor is operated as a switch, and its on and off conditions are controlled by the gate H signal, whereas the low side transistor is controlled by a gate L signal. Note how the transistors are driven in a manner inverse to each other, as indicated by the pulse-type waveforms. In this case, the phase is "fired" by pulsing the high side transistor and the low transistor, to drive a current into the inductor 110 from the power supply node 112. Note that for multiphase VR, there will be 2 or more such phases feeding the common output node 116. Also, in this example, there is a sense resistor 128 (Rsense) that is in series with the inductor 110, between the inductor and the common output node 116, and is used to provide a voltage signal to a current measurement circuit (not shown), for sensing the current through the inductor 110. However, other circuit techniques for sensing the phase current may alternatively used.

It was mentioned above that although the example in FIG. 2 is a sequence of single-phase firings, an alternative may be to interrupt this sequence with instances where 2 or more phases are fired simultaneously. This means, with respect to the embodiment of FIG. 4, that there will be some overlap in the high side transistor on-times (that is, when the gate H signal is asserted) of two or more phases. Simultaneous firing may of course be defined differently depending upon the internal design of the power switch 108.

Still referring to FIG. 4, consider the following "test" of a phase in an embodiment of the invention. While operating in accordance with an embodiment of the invention, apply a variable test voltage to the source node of the high side transistor in that phase. This may result in an inverse relationship being observed between the test voltage level and the percentage of total phase firings occurring on the tested phase. In other words, a high test voltage level simulates higher phase current, which means the phase is less likely to be fired. With a low test voltage level, however, the phase is more likely to be fired (because it is more likely to be determined as the one with lowest phase current).

Figure 5:
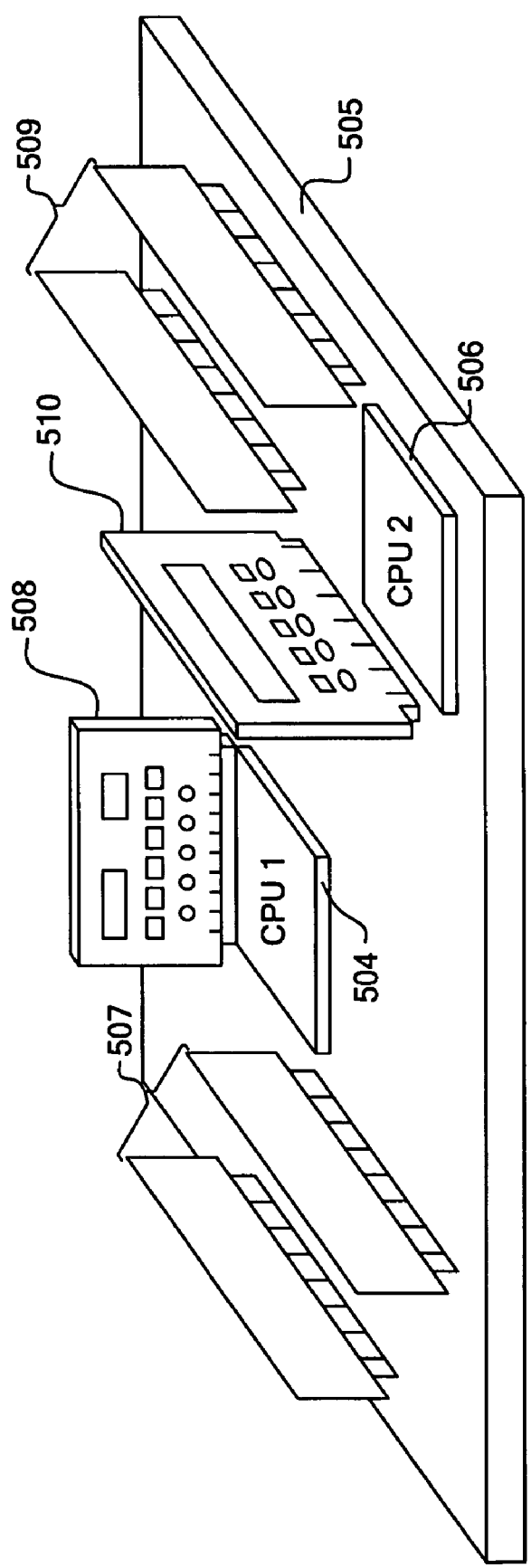
FIG. 5 is a conceptual perspective view of voltage regulator modules installed on a central processing unit (CPU) motherboard.
Figure 6:
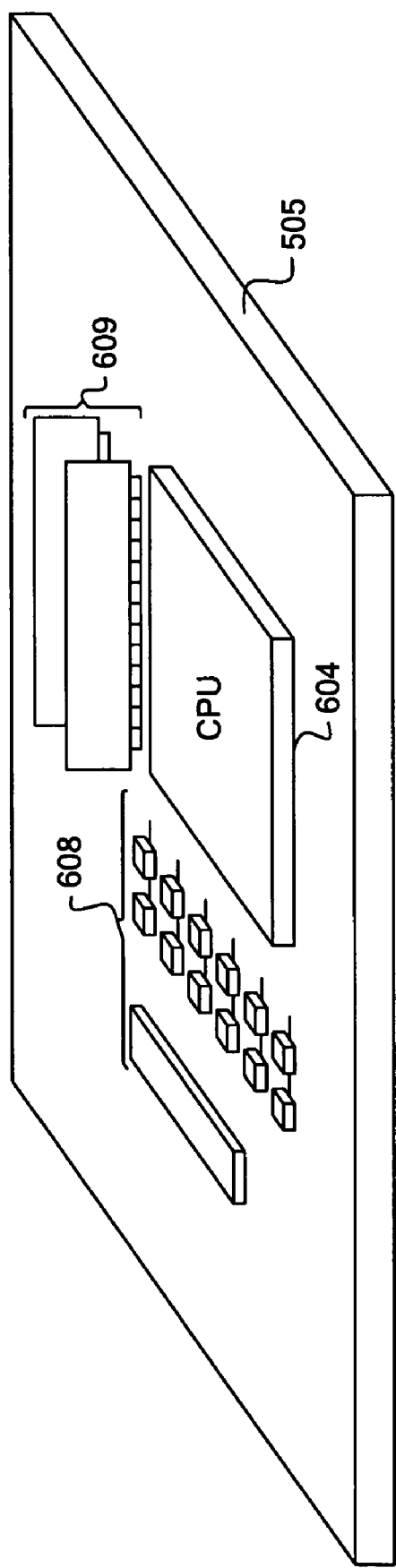
FIG. 6 is a conceptual perspective view of a motherboard with a CPU and its point of use voltage regulator directly installed on the board.

One or more embodiments of the invention described here are directed to a step-down, DC-DC multi phase switching voltage regulator in which the likelihood of a current imbalance situation amongst the different phases is reduced. FIG. 5 and FIG. 6 show different system applications of the multi-phase VR. In FIG. 5, a computer system is shown having a motherboard 505, which is a printed wiring board, on which are installed a pair of CPUs 504, 506 and their respective VR modules 508, 510. Each CPU is coupled to its respective main memory 507, 509 which is also installed on the motherboard 505. Each CPU may have one or more processor cores that draw their power supply current from a Vcc input "pin" of the CPU package (not shown). The circuitry that makes up the VR, including the VR controller 106 and the phases shown in FIG. 1, are in this embodiment installed directly on the module 508, to power the CPU 504. Similarly, VR circuitry is installed directly on the other module 510, to power the CPU 506, such that each of the CPUs has its own separate VR module. This arrangement may be extended of course to more than 2 CPUs on the motherboard 505.

FIG. 6 shows an alternative arrangement for the motherboard 505, where a single CPU 604 is directly installed on the motherboard 505. In this case, the VR 608 is also directly installed on the motherboard 505, to power the CPU 604. The CPU 604 is also coupled to one or more memory modules 609 that are directly installed on the motherboard 505. This configuration is sometimes referred to as "voltage regulator-down".

In yet another embodiment, the VR controller circuitry 106 (see FIG. 1) can be integrated on chip with its CPU.

Figure 7:
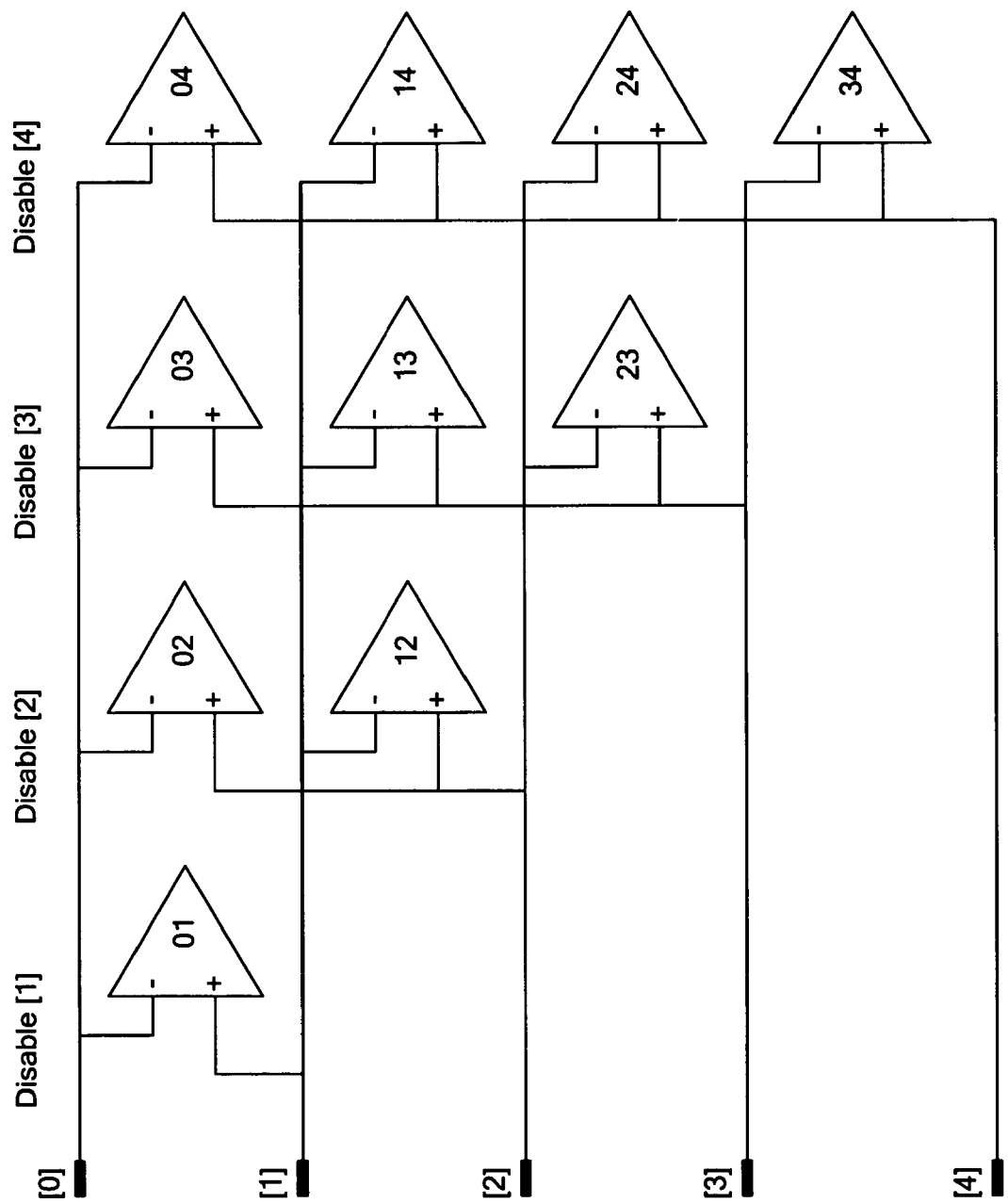
FIGS. 7-9 illustrate details of a lowest phase current comparison scheme that may be used in the phase ordering block of an embodiment of the invention.

Referring now to FIG. 7, a circuit schematic of an example set of differential sense amplifiers that make phase current comparisons is shown. The circuitry is suitable for determining the phase with the lowest phase current, in a five-phase switching voltage regulator. The concept here can be extended to multi-phase VRs having fewer or greater number of phases. In the five-phase embodiment here, a signal representing the phase current for each phase connects to four differential sense amplifiers. Thus, the signal for the current in phase 0 is connected to amplifiers 01, 02, 03 and 04; phase 1 is connected to amplifiers 01, 12, 13 and 14; etc. There are a total of ten sense amplifiers, where each produces a binary bit (in this example, defined as a #1 if the "−" input is less than the "+" input). Note that each amplifier may be disabled, forcing its output to a predefined binary state. For instance, if a particular phase is to be ignored or has been disabled, then the sense amplifiers connected to that phase may also be disabled forcing a predefined, known output from each one. Also, note the nomenclature shown in FIG. 7 for each sense amplifier, which indicates the comparison function performed by each. For example, sense amplifier 01 performs a comparison between the currents of phase 0 and phase 1.

Figure 8:
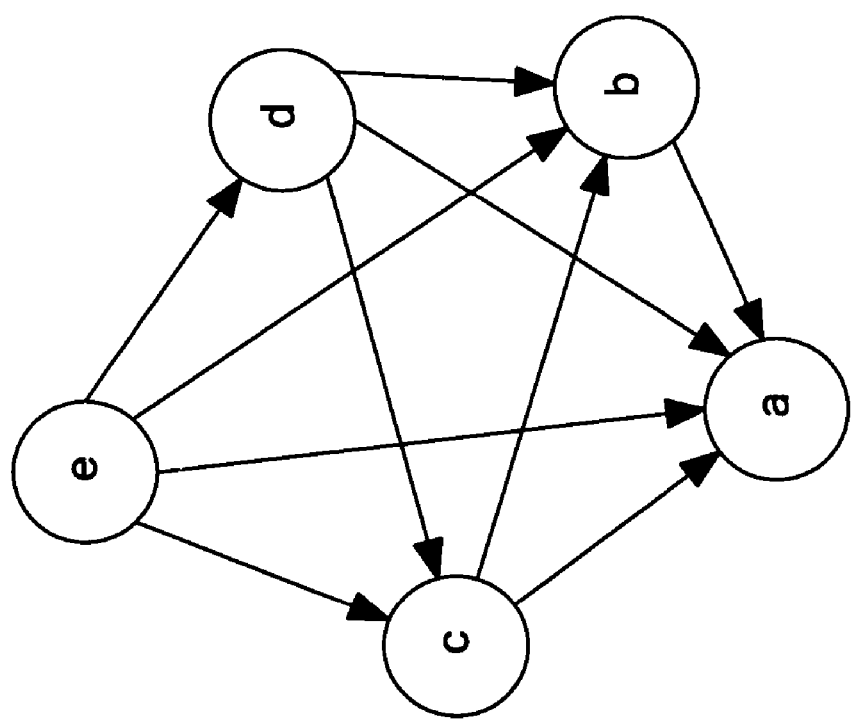

The matrix depicted in FIG. 7 thus provides a 10-bit binary number that may then be encoded into a 3-bit value, by a suitable arrangement of logic gates (e.g., using a 4-input AND gate per phase) to find the one with the lowest current. FIG. 8 shows a diagram of how such logic would work to find the phase with the lowest current, once again for the example five-phase VR. The diagram refers to the five phases as a-e. A higher current is indicated by a higher position (thus, in this example, phase a would have the lowest current). Note there are ten arrows where each arrow signifies the result of the comparison of a respective sense amplifier, pointing from the phase with the higher current to the one with the lower current. It should be noted that in the event there are disabled phases, depending on how the output of the sense amplifier is defined for that case, a disabled phase is not automatically considered the one with the lowest phase current.

Figure 9:
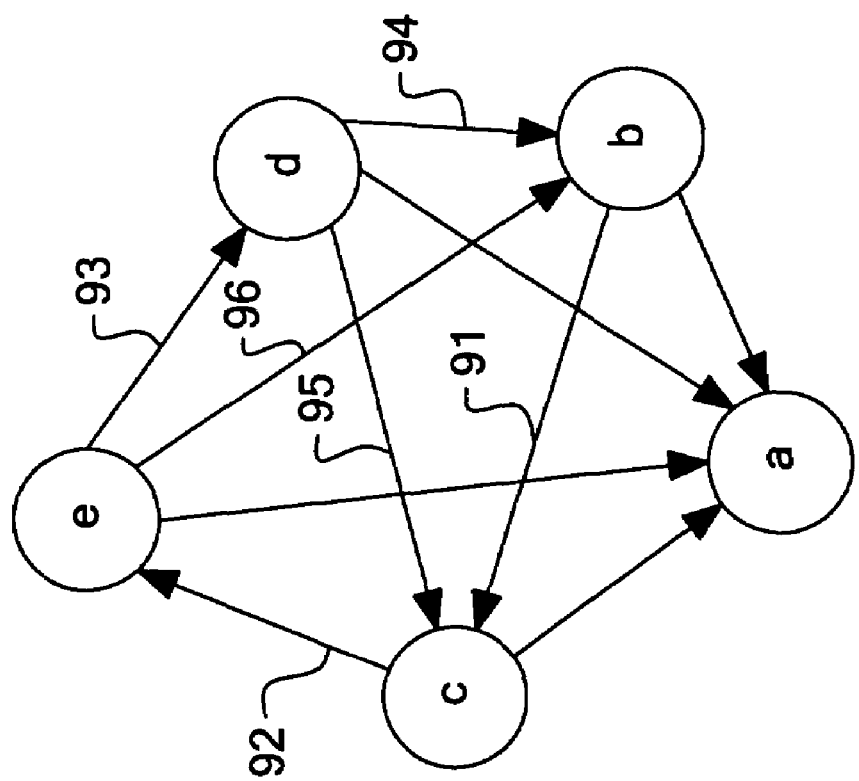

Turning now to FIG. 9, this figure shows the possibility of more complex conflicts in the 10-bit value generated by the sense amplifiers. In this example, phase a would appear to be the one with the lowest current, except that some of the sense amplifiers have indicated that the current in phase b is larger than that of phase c (as shown by arrow 91) and c is larger than e (arrow 92). This is contrary to arrows 93 and 94, which suggest that b is smaller than c. This is also referred to as a "loop" in the comparison results, where the loop is formed with the four phases c, e, d and b. This may be caused by the sensed signal from these phases being all equal, either due to noise, offset error, or simply reflecting essentially zero current in each of the phases (such as during an initial start-up condition). Such conflicts may be more complicated upon initial start-up of the VR when all phases have no current, showing loops that involve more than three phases. However in general, every loop of any size does contain a 3-loop. For instance, the 4-loop [92-93-94-91] includes the 3-loops {92-93-95} and {91-92-96}. If every 3-loop is "removed" then the conflic shall be resolved in each case. The comparison logic should thus be designed to examine every possible 3-loop condition and force its removal, when generating the final 3-bit value that represents the identity of the phase with the determined "lowest" current.

It should be noted that since the outputs of the sense amplifiers can change value at essentially any moment during operation of the VR, the 10-bit result at the output of the sense amplifiers should be latched or flopped in accordance with a dock signal. Meta stable conditions are possible and therefore sufficient time should be given to allow the meta stability in the latches to dissipate. Any conflicts that may have been caused by the meta stability (that appear in the 10-bit value) are resolved by the comparison logic as mentioned above.

The invention is not limited to the specific embodiments described above. For example, although the power switch 108 is depicted in FIG. 4 as high side and low side insulated gate field effect transistors, other types of transistors or solid state power switching devices may be used instead. Accordingly, other embodiments are within the scope of the claims.

What is claimed is:

1. A method for operating a multi-phase switching regulator, comprising:
    while firing N, N being four or more, phases of the regulator in a sequence, determining which one of the phases has the lowest phase current by providing a signal representing the phase current for each of the N phases to N-1 differential amplifiers to generate a binary number having six or more bits, and encoding the binary number to a number that indicates the phase with the lowest current; and then
    selecting the next phase, to be fired in the sequence, as the one that has been determined to have the lowest phase current.

2. The method of claim 1 wherein the firing a plurality of phases in a sequence comprises:
    pulsing a first high side transistor and a first low side transistor to drive a first phase; and then
    pulsing a second high side transistor and a second low side transistor to drive a second phase, wherein the high side and low side transistors for each phase are driven in a manner inverse to each other.

3. The method of claim 1 wherein the determining which one of the phases has the lowest phase current comprises:
    measuring an instantaneous current in a phase inductor of each of the plurality of phases and making a comparison amongst the measurements.

4. An integrated circuit, comprising:
    controller circuitry to control, at least in part, power conversion circuitry having N, N being four or more phases, wherein the controller circuitry is to regulate an output voltage of the power conversion circuitry during a phase firing sequence in which every phase that is about to be fired has the lowest determined phase current among the N phases, the controller circuitry having six or more differential amplifiers in which a signal representing the phase current for each of the N phases connects to N-1 of the six or more differential amplifiers, to generate a six or more bits binary number that is fed to encoder logic whose output indicates the phase with the lowest current.

5. The integrated circuit of claim 4 wherein every phase that is about to be fired in every phase firing sequence has the lowest determined phase current among the plurality of phases.

6. The integrated circuit of claim 4 wherein the controller circuitry is to measure the phase currents of all of its phases and make a comparison based on the measurements, to determine which phase has the lowest phase current.

7. A computer system comprising:
    a step-down dc-dc switching voltage regulator having N, N being four more phases;
    an integrated circuit coupled with the step-down dc-dc switching voltage regulator; and
    controller circuitry for the switching regulator coupled to the integrated circuit, wherein the controller circuitry is to regulate a power supply voltage of the integrated circuit during a phase firing sequence in which every firing selection is based on a determination of which phase has the lowest phase current among the N phases, the controller circuitry having six or more differential amplifiers in which a signal representing the phase current for each of the N phases connects to N-1 of the six or more differential amplifiers, to generate a six or more bits binary number that is fed to encoder logic whose output indicates the phase with the lowest current.

8. The system of claim 7 further comprising a module board on which the regulator is directly installed.

9. The system of claim 7 further comprising a motherboard on which the integrated circuit and regulator are directly installed.

10. The system of claim 7 wherein the regulator comprises:
    a first high side transistor and a first low side transistor, to drive a first phase; and
    a second high side transistor and a second low side transistor, to drive a second phase, wherein the regulator is to drive the high side and low side transistors for each phase in a manner inverse to each other.

11. The system of claim 10 further comprising a module board on which the regulator is directly installed.

12. The system of claim 10 further comprising a motherboard on which the integrated circuit and regulator are directly installed.

13. The system of claim 7 wherein the controller circuitry is to measure the phase currents of all of its phases and make a comparison based on the measurements, to determine which phase has the lowest phase current.

14. The system of claim 13 further comprising a module board on which the regulator is directly installed.

15. The system of claim 13 further comprising a motherboard on which the regulator is directly installed.

16. The system of claim 7 wherein the controller circuitry is integrated on-chip with the integrated circuit.

17. The system of claim 16 wherein the integrated circuit comprises a plurality of processor cores each of which is coupled to be powered by the same output node of the switching regulator.

* * * * *

UNITED STATES PATENT AND TRADEMARK OFFICE
CERTIFICATE OF CORRECTION

PATENT NO. : 7,414,383 B2 Page 1 of 1
APPLICATION NO. : 11/434308
DATED : August 19, 2008
INVENTOR(S) : Burton et al.

It is certified that error appears in the above-identified patent and that said Letters Patent is hereby corrected as shown below:

In column 1, at line 37, delete "dock" and insert --clock--.
In column 6, at line 66, delete "conflic" and insert --conflicts--.
In column 7, at line 8, remove "dock" and insert --clock--.

Signed and Sealed this

Thirteenth Day of January, 2009

JON W. DUDAS
*Director of the United States Patent and Trademark Office*